(12) United States Patent
Burnett et al.

(10) Patent No.: US 9,336,831 B2
(45) Date of Patent: May 10, 2016

(54) HAMR DRIVE FAULT DETECTION SYSTEM

(71) Applicant: Seagate Technology LLC, Cupertino, CA (US)

(72) Inventors: Paul William Burnett, Savage, MN (US); Jon Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/511,756

(22) Filed: Oct. 10, 2014

(65) Prior Publication Data

US 2016/0104514 A1   Apr. 14, 2016

(51) Int. Cl.
*G11B 5/09* (2006.01)
*G11B 27/36* (2006.01)

(52) U.S. Cl.
CPC .................................. *G11B 27/36* (2013.01)

(58) Field of Classification Search
None
See application file for complete search history.

(56) References Cited

U.S. PATENT DOCUMENTS

| | | | | |
|---|---|---|---|---|
| 4,685,097 | A * | 8/1987 | van der Put | 369/53.26 |
| 4,809,091 | A * | 2/1989 | Miyazawa et al. | 360/48 |
| 5,042,023 | A * | 8/1991 | Yokota | 369/47.11 |
| 5,828,583 | A | 10/1998 | Bush et al. | |
| 6,643,081 | B1 * | 11/2003 | Walker et al. | 360/31 |
| 6,982,842 | B2 | 1/2006 | Jing et al. | |
| 7,304,816 | B2 | 12/2007 | Johnson et al. | |
| 7,382,562 | B2 | 6/2008 | Emo et al. | |
| 7,743,989 | B2 * | 6/2010 | Gurevich et al. | 235/455 |
| 7,864,474 | B2 | 1/2011 | Satoh et al. | |
| 8,559,815 | B2 | 10/2013 | Iizuka et al. | |
| 8,854,929 | B1 * | 10/2014 | Champion et al. | 369/13.26 |
| 8,854,930 | B1 | 10/2014 | Clinton et al. | |
| 2003/0007279 | A1 * | 1/2003 | Johnson et al. | 360/75 |
| 2004/0027728 | A1 * | 2/2004 | Coffey et al. | 360/313 |
| 2005/0213436 | A1 * | 9/2005 | Ono et al. | 369/13.02 |
| 2007/0053092 | A1 * | 3/2007 | Emo et al. | 360/46 |
| 2009/0161243 | A1 | 6/2009 | Sharma et al. | |
| 2009/0225464 | A1 | 9/2009 | Juang et al. | |
| 2009/0296257 | A1 | 12/2009 | Nakano et al. | |
| 2010/0211335 | A1 | 8/2010 | Gokita | |
| 2011/0149425 | A1 | 6/2011 | Hatagami et al. | |
| 2011/0205861 | A1 | 8/2011 | Erden et al. | |
| 2012/0243390 | A1 | 9/2012 | Lennard et al. | |
| 2013/0077453 | A1 | 3/2013 | Alex | |
| 2014/0168809 | A1 | 6/2014 | Wilson et al. | |

FOREIGN PATENT DOCUMENTS

WO   WO2011101917   8/2011

OTHER PUBLICATIONS

File History for U.S. Appl. No. 14/230,367.
Notice of Allowance dated Dec. 15, 2015 for U.S. Appl. No. 14/230,367, 11 pages.

* cited by examiner

*Primary Examiner* — Peter Vincent Agustin
(74) *Attorney, Agent, or Firm* — Hollingsworth Davis, LLC (57) ABSTRACT

An apparatus of the present disclosure includes a controller coupled to a read/write head wherein the controller is configured to perform various operations. More specifically, the controller is configured to monitor an operational parameter of the read/write head and to detect a fault based on the operational parameter. The fault indicates that a write enabling energy source is malfunctioning during a write operation. The controller is additionally configured, in response to the fault, to take remedial action to protect data associated with the write operation.

21 Claims, 5 Drawing Sheets

HAMR DRIVE FAULT DETECTION SYSTEM

SUMMARY

An apparatus of the present disclosure includes a controller coupled to a read/write head of a data storage device wherein the controller is configured to perform various operations. More specifically, the controller is configured to monitor an operational parameter of the read/write head and to detect a fault based on the operational parameter. The fault indicates that a write enabling energy source is malfunctioning during a write operation. The controller is additionally configured, in response to the fault, to take remedial action to protect data associated with the write operation.

A system of the present disclosure includes a data storage device comprising an energy source, a read/write head, and a controller that is coupled to the read/write head. The energy source is configured to heat a recording medium. The read/write head is configured to detect whether the energy source is heating the recording medium during a write operation. The controller is configured to monitor an operational parameter of the read/write head, detect a fault based on the operational parameter of the read/write head, and responsive to the fault, take remedial action to protect data associated with the write operation. The fault indicates that the energy source used to heat the recording medium is malfunctioning during a write operation.

A method of the present disclosure includes initiating a heat assisted magnetic recording (HAMR) write operation of data, detecting whether sufficient heat has been provided to enable the HAMR write operation, indicating a fault if sufficient heat has not been provided to enable the HAMR write operation, and responding to the fault by protecting the data associated with the write operation.

An apparatus of the present disclosure includes a controller coupled to a heat-assisted magnetic recording (HAMR) head. The controller is configured to monitor an operational parameter of the HAMR head, determine if the operational parameter is indicative of a fault of the HAMR head, and initiate a remedial action if the operational parameter is indicative of a fault.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In heat-assisted magnetic recording (HAMR) disk drives, also referred to as thermal-assisted magnetic recording (TAMR) disk drives, heat energy used in conjunction with magnetic fields applied to a magnetic recording media to overcome super-paramagnetic effects that limit the areal density of traditional magnetic media. In a HAMR recording device, information bits are recorded on a storage layer at elevated temperatures. The heated area in the storage layer determines the data bit dimension, and linear recording density is determined by the magnetic transitions between the data bits.

In order to achieve desired data density, a HAMR recording head, also known as a slider, includes optical components that direct, concentrate, and transform light energy from an energy source, for example, a laser diode, to heat on the recording media. A HAMR media hotspot on the recording media may need to be smaller than a half-wavelength of light. However, due to what is known as the diffraction limit, optical components cannot focus the light at this scale. One way to achieve very small and confined hotspots that are smaller than the half-wavelength of light is to use an optical near-field transducer (NFT), for example, a plasmonic optical antenna. The NFT provides a surface plasmon resonance at the designed wavelength. At resonance, a high electric field surrounds the NFT due to the collective oscillation of electrons. Part of the electric field tunnels into the storage media and is absorbed, raising the temperature of the media locally above the Curie point for recording. Without the presence of the heat energy the media remains below the Curie point and no erasure or re-magnetization can occur.

Because of the unique componentry specific to HAMR recording heads, for example, the laser diode, the NFT, the optical waveguide and associated electrical connections and preamplifier electronics, the HAMR recording head is prone to failures in ways that differ from perpendicular recording heads. Thus, to predict HAMR failures, the present disclosure provides for monitoring and recording various parameters specific to HAMR to predict head failures. In an example embodiment, one or more parameters are monitored, their values periodically recorded, and the values compared to thresholds. Upon exceeding a threshold, notice is provided and corrective action may be taken. Further details regarding the componentry specific to HAMR and how that componentry may be implemented in predictive fault monitoring are provided below.

Figure 1:
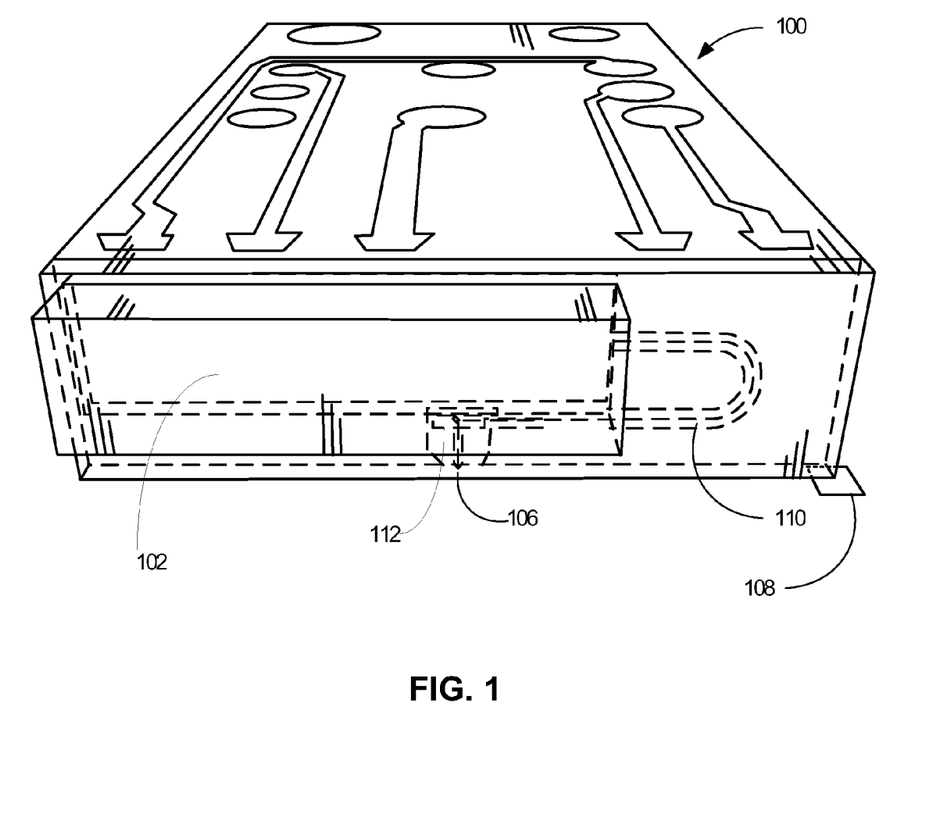
FIG. 1 depicts an example of a HAMR slider.

An example configuration of a HAMR slider is depicted in FIG. 1. The HAMR slider 100 includes an energy source 102, e.g., a laser diode, configured to produce laser light that energizes an optical antenna 112 of a near field transducer (NFT) 106. The laser light produced by the energy source 102 is guided to the NFT 106 through an optical waveguide 110. The head media interface (HMI), also known as an air bearing surface (ABS) is indicated with item number 108.

Figure 2:
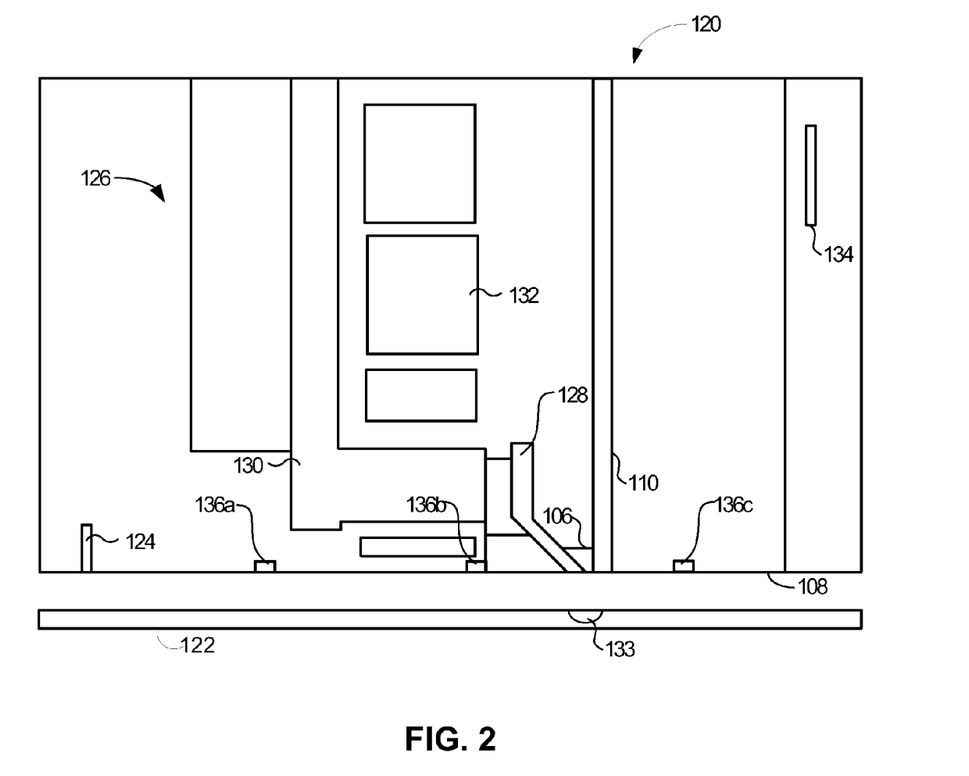
FIG. 2 depicts an example of a read/write head configuration.

A detailed view of an exemplary read/write head configuration 120 contained within HAMR slider 100 is provided in FIG. 2. The read/write head configuration 120 is positioned with ABS 108 proximate magnetic medium 122. The read/write head configuration 120 includes a magnetic read sensor 124 proximate the ABS 108 for reading data from the magnetic medium 122 and a magnetic writer configuration 126 for writing to the magnetic medium 122. The magnetic writer configuration 126 includes NFT 106, intermediate optical waveguide 110, write pole 128 and write coil 132. A hotspot 133 created by the heat emitted by NFT 106 is shown within magnetic medium 122. The read/write head configuration 120 also includes a heater 134 and may also include various other sensors. For purposes of illustration, sensors 136a, 136b, and 136c are shown; the multitude of sensors indicating possible placement locations within the read/write head configuration 120.

Sensors 136a, 136b, and 136c may comprise any variety of sensors including a sensor having a temperature coefficient of resistance (TCR), a varistor, or a thermocouple, for example. One example of a TCR sensor is a dual-ended temperature coefficient of resistance sensor (DETCR). Another example of a TCR sensor is a ground-split temperature coefficient of resistance sensor (GSTCR), wherein two TCR sensors are coupled in parallel between the same or different biasing sources and ground. A TCR sensor measures temperature change by measuring the change in resistance, or rate of change of resistance, across the sensor and, as such, can measure the temperature change at the ABS 108 induced by all thermal condition changes from air pressure, clearance, head operation, and contact, among other changes. As described, a TCR sensor may be used to monitor temperature in the HAMR slider 100 but it may also be used during manufacturing to set head-disk spacing and/or may be used for thermal asperity (TA) detection.

Sensors 136a, 136b, and 136c may alternatively, and/or additionally, comprise any variety of sensors including a light output detection sensor such as a photodiode, photo detector, phototransistor or bolometer. The light output detection sensor may be used to measure the light output of the energy source 102, e.g., laser diode, as a feedback mechanism for regulating the output power of the energy source 102.

The locations of sensors 136a, 136b, and 136c in FIG. 2 represent possible locations for a sensor. Other sensor locations may be used as desired or appropriate. For example, the photodiode may be located proximate to the laser diode in order to reduce the complexity of recording head manufacturing. Further, the read/write head configuration 120 need not be limited to a single sensor or a single type of sensor rather multiple sensors and multiple sensor types may be used as desired or appropriate. A read/write head configuration 120 with no sensors is also contemplated and may be suitable as per a specific application.

Figure 3:
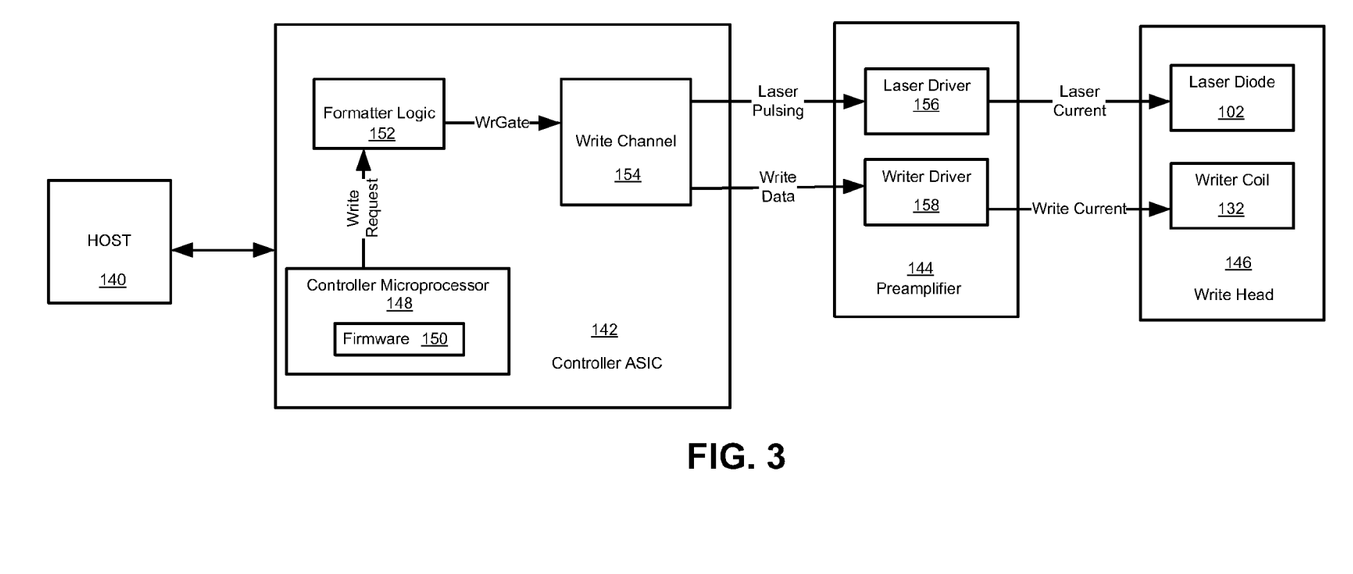
FIG. 3 is a block diagram illustrating an example of components used in a write operation.

Referring now to FIG. 3, a block diagram provides an example of the typical components used by a HAMR drive during a write operation. The components include a host 140, a controller application-specific integrated circuit (ASIC) 142, a preamplifier 144, and a write head 146. The host 140 is generally a device requiring digital data storage, for example a computer, and may be coupled to the HAMR data storage device via host protocols and interfaces such as SATA, SaS, SCSI, PCIe, etc. The controller ASIC 142 generally includes a controller microprocessor 148, operating under control of firmware 150, a formatter 152 utilizing formatter logic, and a write channel 154. The preamplifier 144 includes a laser driver 156 and writer driver 158 while the write head 146 includes laser diode 102 (see FIG. 1) and writer coil 132 (see FIG. 2). Often, the drive contains more than one write head, and the preamplifier contains multiplexing circuitry (not shown) for selecting and routing signals to a desired head. Other embodiments include more than one preamplifier.

In operation, the host 140 initiates a write operation that is communicated to the controller ASIC 142 and specifically to the controller microprocessor 148. The controller microprocessor 148 has been programmed, via the firmware 150, to operate on the host instruction and generate a write request to the formatter 152 as well as seek a desired track/position on the magnetic media 122 (see FIG. 2). The formatter 152 asserts the WrGate signal to the write channel 154 which enables the laser driver 156 and writer driver 158 of the preamplifier 144. In this instance, the write channel 154 provides a laser pulsing signal to the laser driver 156 and the write data is provided to the write driver 158. The current from each of the drivers 156 and 158 activates the laser diode 102 and writer coil 132, respectively, allowing the write head 146 to complete the write operation.

As noted, a HAMR read/write head may use a laser and an NFT to heat the media to aid in the recording process. As a result of the inefficiencies of the optical energy generation and transmission path, the laser and NFT also heat the overall head/slider. The heating can originate from the NFT, the light delivery optics and/or from the laser itself. Energy absorbed in these components may be converted to heat which is conducted to the surrounding materials. This heat can be detected by sensors within the recording head, for example, a differential-ended temperature coefficient of resistivity (DETCR) sensor. The DETCR sensor may be used for sensing head contact detection with the media. The DETCR sensor uses resistance changes caused by temperature change to detect the contact. DETCR sensors are often used during manufacturing to set head-disk spacing and may be used for thermal asperity detection. In the present disclosure, the DETCR sensor may be used for HAMR predictive fault monitoring.

For example, DETCR resistance may be periodically monitored, recorded and compared against a threshold whereupon passing the threshold results in a fault indication. Similarly, the DETCR may be used to sense an increase in temperature/resistance during a write operation whereby a fault is indicated if thermal heating is not detected. Further, the DETCR may be used as a head-media interface health monitor, for example to detect contamination accumulation on the surface of the recording head.

The performance of the energy generation and delivery system of a HAMR drive can change over the life of a drive. For example, the semiconductor p-n junction of the laser diode can change over the life of the drive due to aging. For another example, the NFT's physical shape can be altered from thermal asperity strikes with the recording media. The effects of these applied-energy changes can be sensed in a variety of ways. Ideally, changes that ultimately degrade the ability of the drive to recover data are detected promptly, for example by directly monitoring the laser diode's electrical characteristics for changes. Applied-energy changes can also be detected indirectly, for example, by monitoring for read-back errors, poor read-back signal quality, photodiode signal changes, by the amount of error recovery steps required to recover data, etc. Indirectly-detected changes like these are a consequence of the HAMR drive's applied energy to the media changing. If the applied energy to the media becomes weaker it can lead to poor writes on the written track. Conversely, if the applied energy becomes stronger it can lead to the degradation of data stored on tracks adjacent to the written track (due to adjacent track erasure).

Upon a change in energy generation and/or energy delivery performance, the recording head may still remain usable, but it may often require a recalibration of laser parameters, such as the applied active laser current, to accommodate the change. This recalibration is generally done by writing reserved sectors or test tracks and measuring the bit error performance for various laser currents, and then selecting the laser current with the best bit error rate (BER) performance. When performing this recalibration it is best to first write a center sector/track, write both neighboring sectors/tracks, and then to measure the BER of the center track. This helps to accommodate for the effects imposed by adjacent track erasure.

In the HAMR predictive fault monitoring system of the present disclosure, the laser diode bias current and the laser active current may be used as fault detection parameters. The laser bias current may be periodically monitored, recorded and compared against a threshold whereby passing the threshold results indicates a fault and results in an adjustment to the laser bias current. The laser active current may be periodically monitored, recorded and compared against a threshold whereby passing the threshold results indicates a fault and results in an adjustment to the laser active current. Additionally, the laser forward voltage drop may be used as a fault detection parameter that may be periodically monitored, recorded and compared against a threshold. The laser forward voltage drop can be monitored both while the laser is biased and while the laser is active, each with separate recordings, thresholds and comparisons. These too can be used to predict fault within the recording head.

If a change in a laser diode parametric exceeds a threshold there are a variety of remedial actions that can be taken. A remedial step that can be performed quickly is to perform verification reads after writes (RAW) to ensure data are still being legibly written. Re-measuring the bit error rate of the recording head (including the effects of adjacent track erasure) are another possible remedial step. Yet another remedial step is to perform a recalibration of the laser currents for the recording head as described above. This may be done immediately or after other tests, such as RAW failures or poor BER indicate it is needed. Finally, if all remedial steps fail, the drive can place the head into a "write-protect" state wherein all write commands sent to the head or alternately to the drive result in an error returned to the host.

The output power of the laser may be monitored through use of a photodiode. The photodiode is often located at a point in the optical waveguide where a fraction of the light energy of the laser strikes. The photodiode may provide an output proportional to the laser power. The energy received by the photodiode may also change if the energy transmitted through the NFT changes. For example, a change in the index of reflection at the output of the NFT may result in a difference in the power received by the photodiode. As such, the photodiode may also be used for HAMR predictive fault monitoring. In one example, the photodiode/photo-detector response value, e.g., a current or voltage measurement, is periodically monitored, recorded and compared against a threshold whereby passing the threshold results in a fault indication. In another example, a current or voltage of the photodiode is periodically monitored, recorded and compared against a threshold whereby discontinuity in the photodiode signal indicates detection of undesired mode hopping and thus a fault indication.

The microjog of a recording head is defined as the adjustment required to compensate for the cross-track and down-track spacing differences between the writer and the reader in the head. The read sensor and the writer in a recording head are not co-located, so there are cross-track and down-track offsets that must be accommodated for when writing and reading data. In a HAMR disk drive, the location of the written data is determined by the location of the NFT of the recording head, so it is the offsets between the NFT and the reader which must be accommodated. Moreover, the NFT is made from materials that can deform with wear and damage, so in a HAMR disk drive, the microjog of the recording head can change over the life of the drive. The absolute change in microjog may be periodically monitored, recorded and compared against a threshold whereby passing the threshold results indicates a fault.

In some HAMR embodiments, a technique known as pulsing may be used to control the laser. Pulsing flashes the laser in synchronization with magnetic transitions from the writer coil. The support of pulsing adds controls pins and circuitry within the preamplifier, which adds additional failure points. Thus, the preamplifier and its associated circuitry may be useful in HAMR predictive fault monitoring.

Another parameter for predictive fault monitoring of a HAMR head of the present disclosure includes bit error rate (BER). In one example, the read-only BER by head is periodically monitored, recorded and compared against a threshold whereby passing the threshold results in a fault indication. In another example, the write and/or read BER by head, by several recording zones is periodically monitored, recorded and compared against a threshold whereby passing the threshold results in a fault indication.

A summary of HAMR parameters that may be monitored, recorded, and compared against a threshold is provided below in Table 1. As indicated above, an excursion outside the threshold range results in a fault indication, or in other words a predictive failure, and may initiate a remedial action. It should be noted that the threshold may comprise a predetermined threshold, a threshold range and/or a sliding threshold that may slide to prevent false fault indications, may slide to accommodate the aging the of the HAMR head, or slide as otherwise necessary to accommodate the natural wear of the HAMR head.

TABLE 1

HAMR Threshold Parameters

| | |
|---|---|
| 1. | Laser Bias Current |
| 2. | Laser Active Current |
| 3. | Laser Forward Voltage Drop while Biased |
| 4. | Laser Forward Voltage Drop while Active |
| 5. | Laser Calibration Values |
| 6. | Photodiode/Photo-Detector Response Value |
| 7. | Photodiode Discontinuities During Write |
| 8. | DETCR Resistance, by head |
| 9. | DETCR Temperature During Write, by head |
| 10. | DETCR Interface Health Monitor |
| 11. | Read-Only BER by Head |
| 12. | Write and/or Read BER by Head, by Zone |
| 13. | Microjog changes, by head |
| 14. | Adjacent track erasure, by head |

The HAMR predictive fault monitoring system of the present disclosure may also use HAMR non-threshold type parameters for fault indication or used in combination with other metrics for determination of fault indication. HAMR non-threshold type parameters may include values that are solely measured and logged for failure analysis purposes. The collection of this additional data may be used in future firmware updates or for the adjustment of SMART thresholds. One example of a non-threshold parameter comprises drive temperature. Although high temperature alone may not indicate a fault, it may induce certain failure mechanisms within the drive. These mechanisms may not be known when a new drive product is initially manufactured, however as drives are returned for failure analysis they may become learned. The manufacturer can then provide revised firmware or thresholds for better fault prediction. Another example includes the writer power-on hours; as the number of logged hours increases the closer the head is to a failure. Background sectors written and System recording zone sectors written are another non-threshold type parameter. These parameters contribute to the active time for the HAMR write operations, thus increasing the write power on time that are not applied to direct host sectors written workload.

Examples of corrective or remedial actions for HAMR threshold and HAMR non-threshold parameters of the HAMR predictive fault monitoring system of the present disclosure include, but are not limited to, verifying proper write operation by reading the data after it was written ("read after write" or RAW), measuring the bit error rate (BER) of the recording subsystems, providing a warning to the host computer, or returning a status message to the host computer on a particular command operation. In the instance of detection of a fault during an actual HAMR write operation, the remedial action may be directed to the protecting the data associated with the write and may include, for example, re-initiating the write or re-initiating the write and following with a read verification.

Figure 4:
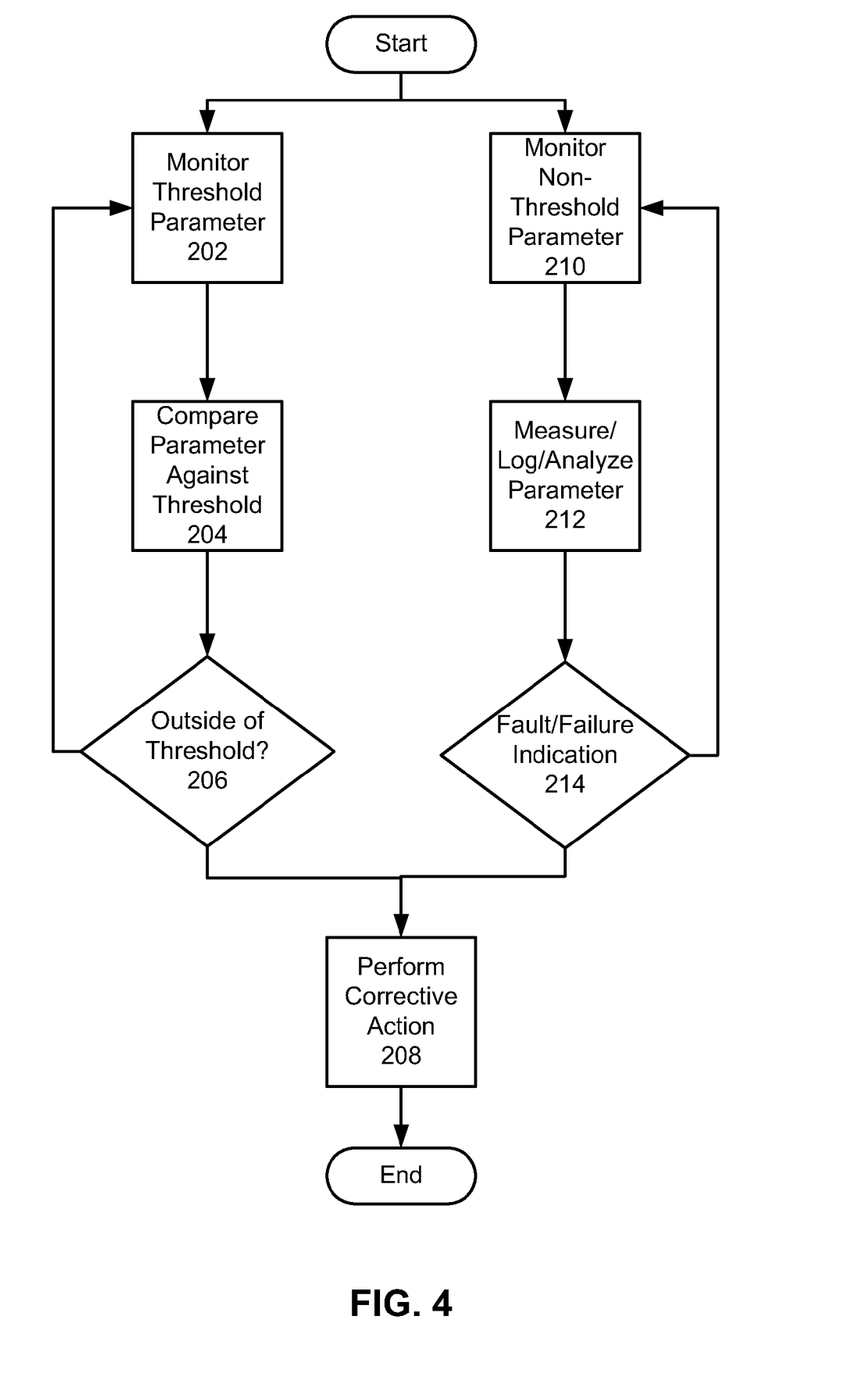
FIG. 4 is a flowchart illustrating an example of HAMR predictive fault monitoring according to various embodiments.

An example method of HAMR predictive fault monitoring of the present disclosure is illustrated in the flow chart of FIG. 4. In the instance of a HAMR threshold parameter, the threshold parameter is monitored 202 and compared against a threshold 204. If the parameter is outside of the threshold 206, then a fault/failure has occurred and a corrective action is performed 208. If the parameter is within the threshold 206, then monitoring of the parameter continues 202. In the instance of a HAMR non-threshold parameter, the non-threshold parameter is monitored 210, and measured, logged and/or analyzed for indications of coming faults or failures, 212. If the analysis indicates a potential or actual fault/failure 214, then a corrective action is performed 208. If the analysis indicates no fault/failure 214, then the monitoring of the non-threshold parameter continues 210.

Figure 5:
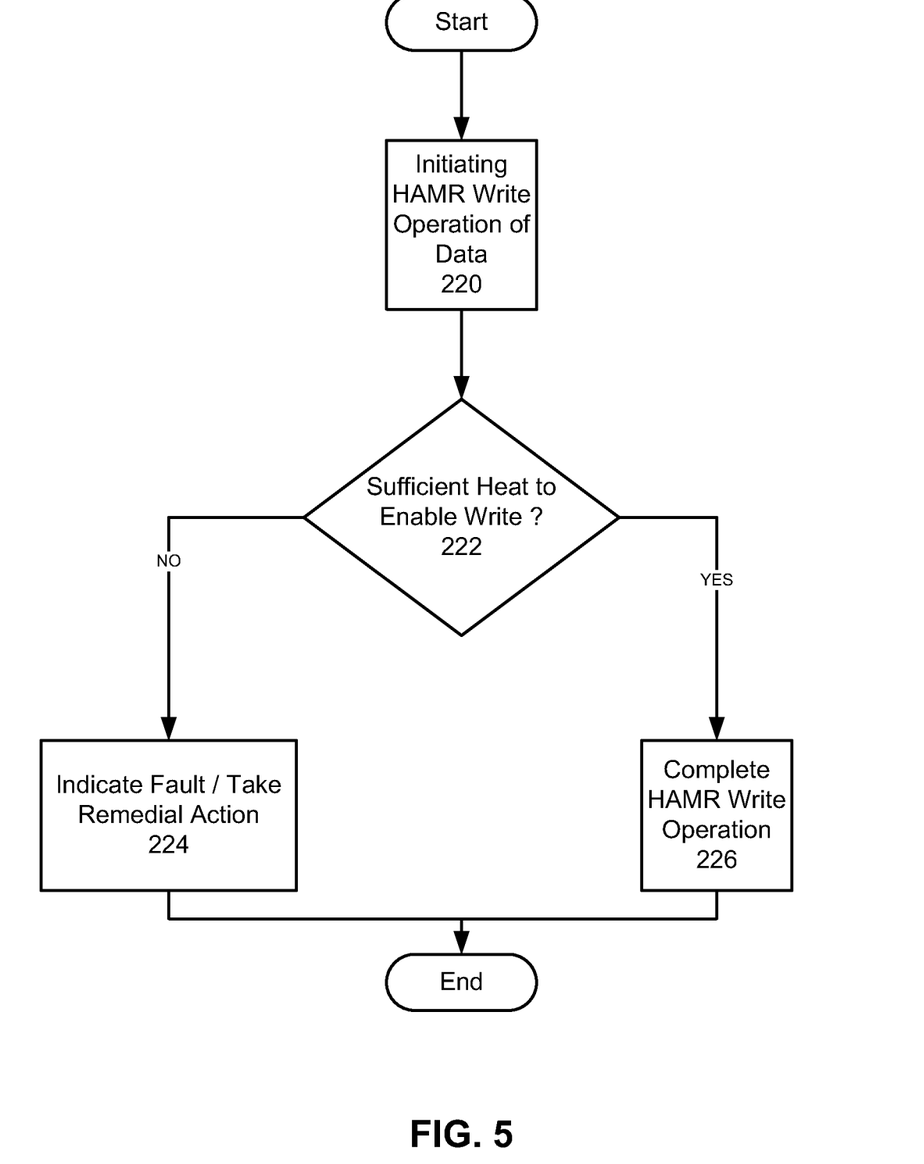
FIG. 5 is a flowchart illustrating an example of HAMR predictive fault monitoring according to various embodiments.

A more specific example of a method of HAMR predictive fault monitoring is illustrated in FIG. 5 and includes initiating a HAMR write operation of data 220, detecting whether sufficient heat has been provided to enable the HAMR write operation 222, indicating a fault if sufficient heat has not been provided to enable the HAMR write operation and responding to the fault by protecting data associated with the write operation 224. If sufficient heat has been provided to enable the HAMR write operation, the write operation continues and completes 226.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A data storage apparatus, comprising:
a controller coupled to a HAMR read/write head, the controller configured to:
monitor an operational parameter of the HAMR read/write head;
detect a fault based on the operational parameter of the HAMR read/write head, wherein the fault indicates that a write enabling energy source configured to heat a recording medium is malfunctioning during a write operation; and
responsive to the fault, take remedial action to protect data associated with the write operation.

2. The apparatus of claim 1, wherein the operational parameter comprises an operational parameter of a photodiode.

3. The apparatus of claim 1, wherein the operational parameter comprises an operational parameter of a temperature sensor.

4. The apparatus of claim 1, wherein the remedial action comprises reporting a fault status to a host.

5. The apparatus of claim 1, wherein the remedial action comprises re-initiating the write operation with a following read verification.

6. The apparatus of claim 1, wherein the fault is triggered based on the energy source operating outside a desired operating range and wherein the desired operating range is adjustable to prevent false indicators.

7. The apparatus of claim 6, wherein the desired operating range is adjustable to accommodate aging of the apparatus.

8. A data storage system, comprising:
an energy source configured to heat a recording medium;
a read/write head configured to detect whether the energy source is heating the recording medium during a write operation; and
a controller coupled to the read/write head and configured to:
monitor an operational parameter of the read/write head;
detect a fault based on the operational parameter of the read/write head, wherein the fault indicates that the energy source used to heat the recording medium is malfunctioning during the write operation; and
responsive to the fault, take remedial action to protect data associated with the write operation.

9. The system of claim 8, wherein the operational parameter comprises an operational parameter of at least one of a photodiode and a temperature sensor.

10. The system of claim 8, wherein the remedial action comprises re-initiating the write operation with a following read verification.

11. The system of claim 8, wherein the fault is triggered based on the energy source operating outside a desired operating range and wherein the desired operating range is adjustable to prevent false indicators or to accommodate the aging of the system.

12. A method, comprising:
initiating a heat-assisted magnetic (HAMR) write operation of data;
detecting whether sufficient heat has been provided to enable the HAMR write operation;
indicating a fault if sufficient heat has not been provided to enable the HAMR write operation; and
responding to the fault by protecting the data associated with the write operation.

13. The method of claim 12, wherein detecting comprises detecting light, detecting temperature, or detecting both light and temperature to determine if sufficient heat has been provided to enable the HAMR write operation.

14. The method of claim 12, further comprising reporting the fault.

15. The method of claim 12, further comprising responding to the fault by reinitiating the write operation and initiating a subsequent read verification operation.

16. The method of claim 12, wherein the fault is triggered based on the detected heat falling outside a desired operating range and wherein the desired operating range is adjustable to prevent false indicators.

17. An apparatus, comprising:
a controller coupled to a heat-assisted magnetic recording (HAMR) head, the controller configured to:
monitor an operational parameter of an energy source of the HAMR head configured to heat a recording medium during a write operation;

determine if the operational parameter is indicative of a fault of the energy source; and initiate a remedial action comprising protecting data associated with the write operation if the operational parameter is indicative of the fault.

18. The apparatus of claim 17, wherein the operational parameter comprises a threshold parameter and the operational parameter is determined to be indicative of a fault if the operational parameter is outside a threshold.

19. The apparatus of claim 18, wherein the threshold parameter comprises a laser bias current, a laser active current, a laser forward voltage drop, a laser calibration value, a photodiode/photo-detector response value, a photodiode discontinuity, a differential-ended temperature coefficient of resistivity (DETCR) resistance, a DETCR temperature during write, a DETCR interface health monitor, a read-only bit error rate (BER) by head or a write or read BER by head and zone.

20. The apparatus of claim 17, wherein the operational parameter comprises a non-threshold parameter and the non-threshold parameter comprises a drive temperature, a number of writer power-on hours, a type of background sectors written, a type of system zone writes, or the number of write operations started.

21. The apparatus of claim 17, wherein the remedial action comprises an action other than, or in addition to, adjusting the operational parameter.

* * * * *